INVENTOR.
DEWEY S. WEISS
BY
Attorney

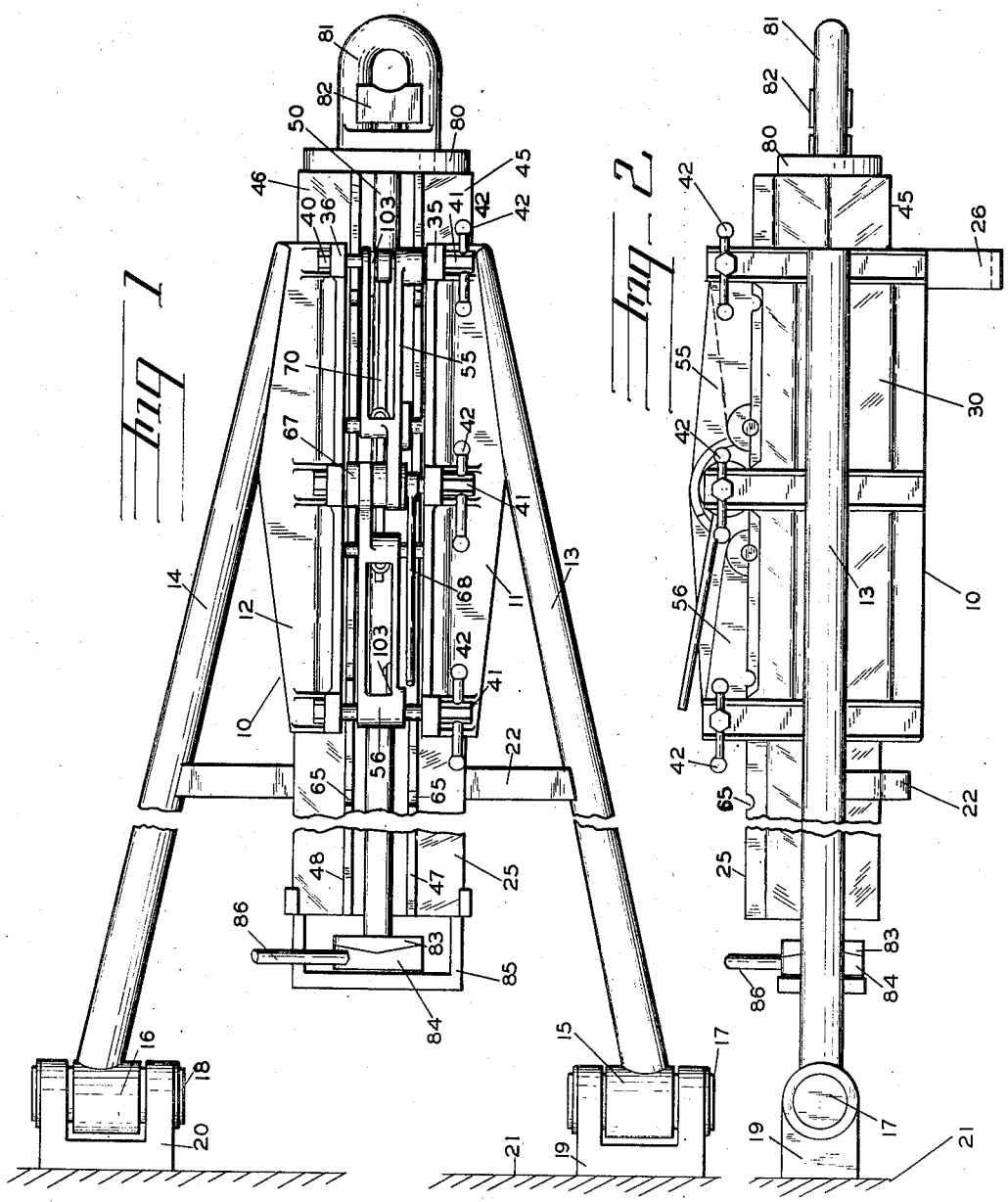

April 10, 1951     D. S. WEISS     2,548,085
TRAILER DRAWBAR

Filed April 15, 1947     3 Sheets-Sheet 3

INVENTOR.
DEWEY S. WEISS
BY
Attorney

Patented Apr. 10, 1951

2,548,085

UNITED STATES PATENT OFFICE 2,548,085

TRAILER DRAWBAR

Dewey S. Weiss, Portland, Oreg.

Application April 15, 1947, Serial No. 741,575

16 Claims. (Cl. 280—33.44)

My present invention relates to a trailer drawbar assembly for coupling a trailing vehicle to a leading vehicle, for example, a motor van to a trailer van for long distance hauling. Another use to which my invention may be put is in coupling logging trailers to a motor cab. Various other uses will be readily apparent and I do not intend to be limited to a specific form of vehicle to which my invention may be attached.

The primary object of my invention is to provide a sturdy extensible drawbar which may be readily locked in a plurality of adjusted positions or shifted to another position of extension without the use of additional tools. It is the principal object of my invention to provide means whereby the distance between the trailing end of a leading vehicle and the forward end of a trailing vehicle may be quickly adjusted to suit various lengths of loads. For example, some vans are provided with openings in their forward walls so that long articles need not overhang the rear end of the van; in which case the forward end of a lengthy article extending through such an opening might interfere with the leading vehicle were it not possible to adjust the distance between the vehicles. It is obvious that an adjustable mechanism capable of extension to considerable length must be sturdy, particularly when extended, and it is an object of my invention to provide a rapidly adjustable extensible drawbar which is fully capable of meeting heavy load requirements when fully extended.

A further object of my invention is to provide means for adjusting the degree of extension of a drawbar, requiring relatively few parts, which parts are protected against breakage or bending under abusive use.

Further objects and advantages of my present invention will be readily apparent following a study of the following specification and accompanying drawings wherein like numerals refer to like parts throughout.

In the drawings Fig. 1 is a plan view, partly broken away, of a preferred embodiment of my invention;

Fig. 2 is a view in side elevation of the embodiment disclosed in Fig. 1;

Figure 3:
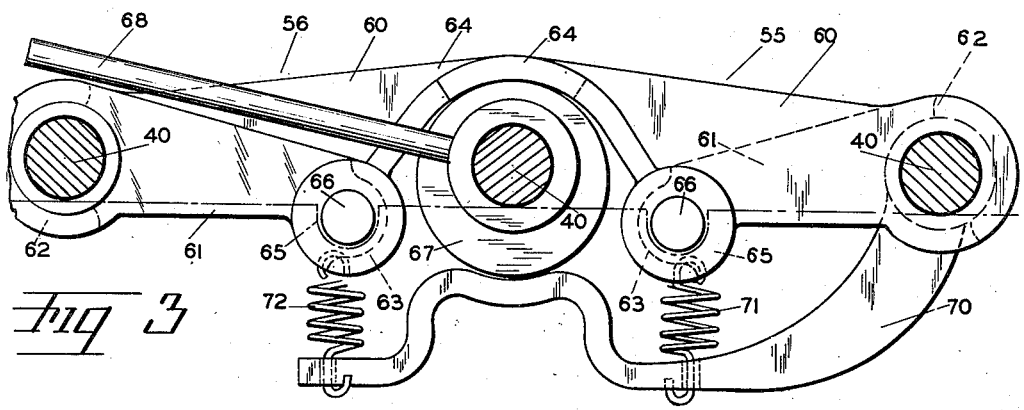
Fig. 3 is a vertical detail on an enlarged scale of the adjusting and locking mechanism of my present invention in one form.

In Figs. 1, 2, 3 and 6 one embodiment of the present invention is fully illustrated.

The invention comprises a sleeve generally indicated by the numeral 10, which is adapted to be mounted in general alignment with a vertical plane through the longitudinal axis of a trailing vehicle. For this purpose the sleeve is provided with laterally extending flanges 11 and 12 to which are welded or otherwise suitably secured the forward ends of a pair of convergent draftbars 13 and 14 respectively, which may comprise sections of strong tubing. The rearmost ends of the draftbars are welded to transverse straps 15 and 16 which may be journaled upon pintles 17 and 18 passed through clevises 19 and 20, respectively, adapted to be welded or otherwise suitably secured to the structure of the trailing vehicle generally indicated by the numeral 21. A cross brace 22 may be welded to the draftbars and so shaped as to extend beneath the extensible drawbar, generally indicated by the numeral 25, which is mounted in the sleeve 10. I thus provide a rigid frame braced against sideward bending of the drawbar assembly, which mounts a drawbar sleeve longitudinally upon the front end of a trailing vehicle. The sleeve substantially bisects the angle between the converging draftbars and is pivotally movable in a vertical plane passing through the longitudinal axis of the vehicle. A stirrup 26 is preferably depended from the forward end of the sleeve 10 to prevent the end of the assembly from dropping onto the ground, thus saving the mechanism from injury and from becoming clogged by an excess amount of mud or gravel.

In this form the sleeve (Fig. 6) comprises a pair of opposed channel members 30 and 31 having their longer lower legs welded together along their line of abutment at 32. The shorter upper legs terminate in vertically extending flanges 33 and 34 extending longitudinally of the sleeve and between which there is an open space. The flange 33 is provided with a plurality of extensions 35, adapted to receive and journal pivot members as will presently appear, and the flange 34 is provided with a plurality of extensions 36 adapted to receive the opposite ends of the pivot members. The outer surfaces of the channel members 30 and 31 and the extensions thereof are braced by vertical ribs 37 and 38 respectively and, of course, are braced longitudinally by the flanges 11 and 12 so that a very rigid sleeve is thus formed. The sleeve flanges 33 and 34 may be sprung toward each other a slight amount as permitted by the rigidity of the metal, such slight springing achieving a function as will presently appear.

Each of the pairs of extensions 35 and 36 carry a transverse pivot member in the form of a bolt 40, having means (not shown) keying the bolt to the extension 36 so that the bolt is non-rotatably mounted in position. The threaded end of the bolt extends beyond the extension 35 and is engaged by a long cap nut 41 through which passes a turnbar 42. Tightening of the nuts 41 will cause inward springing of the flanges toward each other, and releasing of the nuts 41 will permit the flanges to separate as permitted by the resiliency of the sleeve walls.

The drawbar 25 comprises a pair of opposed bars 45 and 46 shaped to provide walls contiguous to the inner surfaces of the sleeve. The bar 45 terminates in an upwardly extending flange 47 contiguous to the flange 33 and the bar 46 terminates in a parallel flange 48 contiguous to the flange 34. A plurality of transverse plates 49 are welded to the bars to form a rigid structure, each of the plates having an opening therethrough through which a rod 50 may extend longitudinally of the drawbar. I thus provide a rigid drawbar having an open top and bottom to permit the removal of dirt and gravel which might accumulate therein. The drawbar and the sleeve present a plurality of contiguous surfaces which prevent relative rotation of the drawbar with respect to the sleeve. Tightening of the nuts 41 causes frictional clamping of the drawbar in an adjusted position with respect to the sleeve.

As seen in Figs. 1 and 2 there are preferably three pivot bolts 40 mounted upon the sleeve 10. The outer pivot bolts 40 provide means pivotally to support a pair of latch-levers 55 and 56 which extend toward each other longitudinally of the space between the flanges of the drawbar. Each of the latch-levers preferably comprises a pair of arms 60 and 61 in parallel, spaced relation to each other and connected together by a cross brace 62 partially surrounding the bolt 40 and a cross brace 63 at the forward end of the arm 61. The arm 60 terminates in an upwardly and forwardly extending curved hook 64 in position to overlie the central bolt 40.

The flanges 47 and 48 of the drawbar are provided with a plurality of spaced notches 65 adapted to receive and retain bosses 66 extending laterally from the forward ends of the arms 61. A cam 67 is rotatably mounted upon the bolt 40 in position to engage the lower surfaces of the hooks 64 and is provided with a lever 68 of sufficient length to extend beyond the outer bolts 40. As seen in Fig. 3 the cam 67 is in one extreme position permitting the lowering of the bosses 66 into a certain group of notches 65, thus holding the drawbar in one of a plurality of extended positions. Rotation of the cam 67 to the other extreme position permitted by movement of the lever 68 will raise the bosses above the edges of the flanges so that longitudinal movement of the drawbar is permitted.

In order to assure downward movement of the bosses into the notches 65 when such movement is possible, I provide a cam-follower-lever 70 which is pivotally mounted on one of the extreme bolts 40 between the arms 60 and 61, which extends forward beneath the cam 67 and is held in engagement therewith by a pair of springs 71 and 72 tensioned between the cam-follower-lever and the cross braces 63. It will be readily apparent that the springs constantly urge the bosses downward but that breakage of parts will not occur in the event that the cam is rotated when the bosses are not aligned with the notches. If the drawbar is so positioned that the notches are not aligned with the bosses the cam may still be rotated to lowering position and the springs will be extended. The operator may thereafter shift the drawbar slightly until the bosses drop into place.

The leading ends of the bars 45 and 46 are welded or otherwise suitably secured to the face 80 of a longitudinally extending hook-engaging eye 81 which may be engaged with a coupling hook or other member attached to a leading vehicle. The eye 81 is preferably of considerable length and provided with a shoe 82 which is secured to the forward end of the rod 50. The rod 50 preferably passes through all of the cross braces 49 and extends beyond the extreme end of the drawbar 25. A cam 83 is suitably secured to the extreme end of the rod 50 and engages a rotatable cam 84 pivotally mounted on the rod 50 in position to bear against a bracket 85 welded to the end of the drawbar. The cam 84 is provided with an operating lever 86 by means of which the cam may be rotated to force the rod 50 longitudinally of the drawbar and cause the shoe 82 to close the opening of the eye 81, whereby tight coupling of the drawbar to a coupler hook may be achieved. Suitable means (not shown) may be provided to urge the rod in the opposite direction upon rotation of the cam to the position illustrated in Fig. 1. The shoe-operating mechanism herein illustrated is exemplary of many forms known to the art and my invention is not to be limited to association with the form herein illustrated.

Operation: The operation of my invention as thus far described is as follows:

The drawbar assembly is attached to a trailing vehicle. The operator decides the length desired between the leading vehicle and the trailing vehicle and adjusts the mechanism accordingly in the following manner: The nuts 41 are loosened and the cam 67 rotated to raise the bosses from the notches whereupon the drawbar may be longitudinally moved to the desired position. Repositioning of the cam 67 permits engagement of the lugs with the notches and tightening of the bolts 41 provides additional assurance against longitudinal displacement of the drawbar. The drawbar may thereafter be associated with a coupling hook or other suitable member on the leading vehicle and the shoe 82 positioned thereagainst for safety and to prevent loose play between the vehicles. In the event that initial positioning of the drawbar should not exactly align the notches with the lugs, the cam 67 may nevertheless be previously positioned and the springs 71 and 72 will prevent breakage and urge the lugs into place when exact alignment is achieved. It is to be appreciated that the turnbars 42 may be eliminated and that the nuts 41 may function simply to hold the pivot bolts in position, the frictional engagement of the drawbar with the sleeve being in such case light so that longitudinal adjustment will be possible upon disengagement of the lugs. I prefer, however, to tighten the sleeve around the drawbar as an additional precaution.

Figure 4:
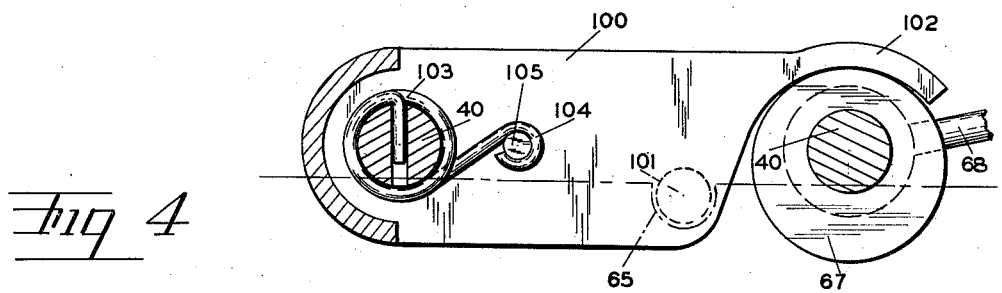
Fig. 4 is a vertical detail of a modified form of adjusting means.

In Fig. 4 I have illustrated a modified form of latch-lever which is similar to a previously described form except in shape. The latch-lever in this case comprises at least one arm 100 pivotally mounted upon the bolt 40 and having at least one lateral lug 101 adapted to engage with a notch 65 on one of the flanges of the drawbar. The arm 100 terminates in a hook portion 102 adapted to engage the surface of a cam 67 as previously described. The sleeve may be provided with one such latch-lever but I prefer to utilize a pair of oppositely facing latch-levers as previously described. The pivot member 40 about which the latch-lever rotates is non-rotatably secured to the sleeve member as previously described and one end of a spring 103 is anchored thereto as by means of passing an end of the spring through an opening in the pivot member. The opposite end of the spring is provided with a hooked extension 104 adapted to engage a lug 105 on the surface of the arm 100, the spring being so wound and tensioned as to urge the lug 101 downward into the notch 65. Rotation of the cam 67 to its opposite extreme will raise the lug 101 from the notch 65. Upon repositioning of the cam the lug may reengage a notch, or if the notch is not aligned the spring will permit the lug to rest upon the flange of the drawbar until exact alignment is achieved.

As seen in Fig. 1 this embodiment may be supplied with springs 103 aiding and supplementing the springs 71 and 72, if desired.

Figure 5:
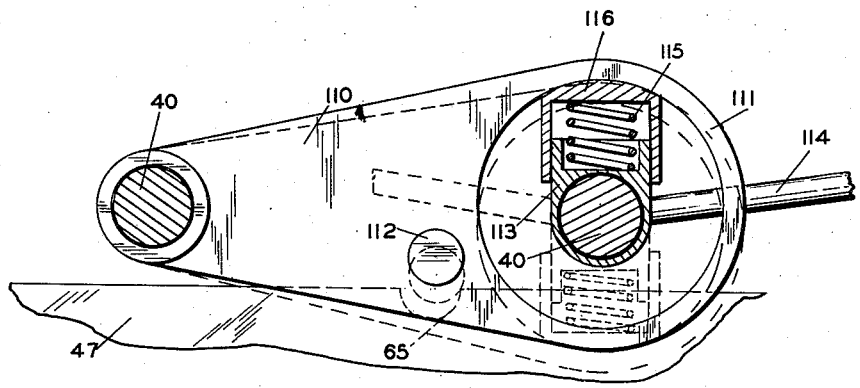
Fig. 5 is a vertical detail of a further modified form of adjustment means.
Figure 6:
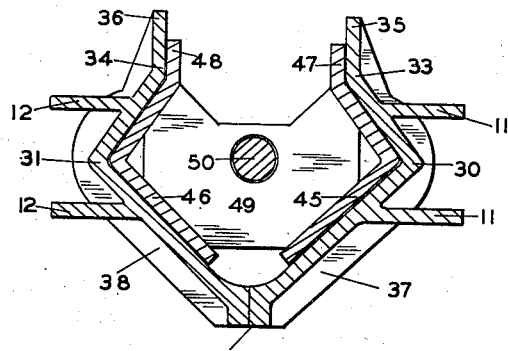
Fig. 6 is a typical cross section through the adjustable drawbar and sleeve assembly of Fig. 1.

In the modification shown in Fig. 5 a latch-lever 110 is pivotally mounted upon one of the pivot members 40 and terminates in a strap 111 providing a circular opening therethrough through which the next pivot member 40 passes. The latch-lever is provided with a lug or lugs 112 adapted to engage the notches 65 as previously described. Pivotally mounted upon the pivot member 40 passing through the opening provided by strap 111 is a spring-seating member 113 to which is attached a lever 114. A spring 115 seated in member 113 is housed within a shoe 116 adapted to engage the inner surface of the strap 111 at all times. The shoe 116 is axially movable with respect to the seating member 113 so that compression and extension of the spring 115 may be achieved. The device is thus a form of cam device which upon rotation to the position illustrated in full line in Fig. 5 has raised the lug from engagement with the notch. Upon rotation of the lever 114 to its opposite extreme the lug will be resiliently urged into engagement with the notch. If alignment has not been achieved the spring will be compressed, and will urge the lug into the notch when alignment is achieved. A further feature of safety is provided in that rotation of the lever to the position illustrated in Fig. 5 may be permitted without disengaging the lug from the notch since the spring 115 will merely be compressed and will resiliently urge the arm 110 upwardly. This condition may occur if grit is present in the notch or if the edges of the notch become worn so that a slight overhang prevents free movement of the lug therefrom. If the operator rotates the lever to disengaging position and the arm does not rise, he can tap the drawbar until the lug is free to snap upwardly due to the force of spring 115.

Figure 7:
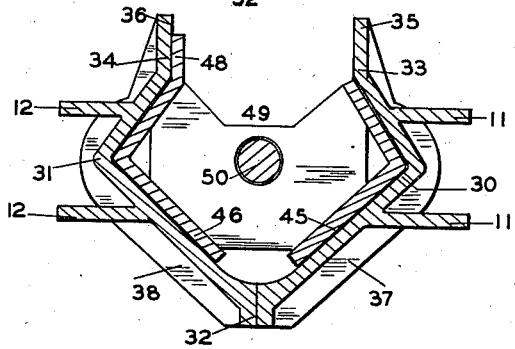
Fig. 7 is a typical cross section through a modification which the invention may assume.

In Fig. 7 I have shown a modified form which the drawbar may take, the modification comprising eliminating the flange 47, in which case the latch-lever or the pair of latch-levers associated therewith would need but one lug a piece. In all other respects the modification of Fig. 7 is similar to the modification of Fig. 6.

Figure 8:
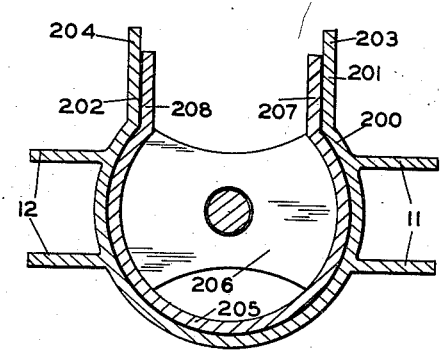
Fig. 8 is a typical cross section through a further modification of the adjustable sleeve and drawbar assembly.

In Fig. 8 I have illustrated a further form which my invention may take. In this modification the sleeve 200 comprises a length of tubing or pipe having a slot cut in its surface and the edges thereof bent upwardly to form parallel flanges 201 and 202 having extensions 203 and 204 respectively to mount pivot bolts as previously described. The drawbar in this case would comprise a length of tubing or pipe 205 having stiffening cross braces 206 at spaced points therein, the tube being slotted and the edges of the slot bent upwardly to provide notch-bearing flanges 207 and 208 adapted to lie contiguous to the flanges 201 and 202 respectively. In all other respects this form of the invention would be similar to the forms previously described.

Figure 9:
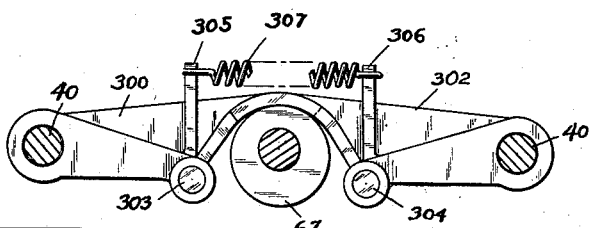
Fig. 9 shows a further modification of certain parts.

Fig. 9 illustrates a further modification of the latch levers. These levers 300 and 302 are mounted on spaced bolts 40 and have curved extensions adapted to overlie the cam 67 in order that their bosses 303 and 304 may be raised from or lowered into latching engagement with the drawbar. The levers are provided with upwardly extending fingers 305 and 306 between which is tensioned an overcenter spring 307. The spring keeps the levers firmly against cam 67 unless misalignment with the notches occurs, in which case the spring yields, and later snaps the lugs into the notches. The levers 300 and 302 together with their bosses 303 and 304 constitute abutment engaging means adapted to cooperate with longitudinally spaced abutments such as the notches 65 (Figs. 1 and 2).

Having illustrated and described various preferred embodiments of my invention, it should be readily apparent to those skilled in the art that modifications in detail and arrangement thereof are permissible without departing from my invention. All such modifications as come within the true spirit and scope of the appended claims are considered a part of my invention.

I claim:

1. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a longitudinal flange thereon, and a latch lever pivotally mounted between the flanges of said sleeve and extending longitudinally of said drawbar, said lever comprising a laterally extending boss overlying the flange of said drawbar, and said flange of said drawbar having a plurality of spaced notches therein engageable by said boss to retain said drawbar in any of a plurality of longitudinally adjusted positions.

2. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinal flanges thereon, the flanges of said sleeve and of said drawbar being substantially contiguous, and a latch lever pivotally mounted between the flanges of said sleeve and extending longitudinally between the flanges of said drawbar, said lever comprising a pair of laterally extending bosses overlying the flanges of said drawbar, and said flanges of said drawbar having a plurality of spaced notches therein engageable by said bosses to retain said drawbar in any of a plurality of longitudinally adjusted positions.

3. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinally extending flanges thereon, the flanges of said sleeve and of said drawbar being substantially contiguous, and a pair of latch members pivotally mounted between the flanges of said sleeve and extending longitudinally between the flanges of said drawbar, each of said levers comprising a laterally extending boss of sufficient length to overlie one of the flanges of said drawbar, and said flange of said drawbar having a plurality of spaced notches therein engageable by said bosses to retain said drawbar in any of a plurality of longitudinally adjusted positions.

4. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinally extending flanges thereon, the flanges of said sleeve and of said drawbar being substantially contiguous, and a pair of latch members pivotally mounted between the flanges of said sleeve and extending longitudinally between the flanges of said drawbar, each of said levers comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions.

5. A drawbar assembly for coupling a trailing vehicle to a leading vehicle comprising a sleeve having a pair of longitudinal flanges thereon, means for longitudinally supporting said sleeve upon a vehicle with its longitudinal axis substantially aligned with the longitudinal axis of the vehicle, a drawbar slidably mounted in said sleeve and having a pair of longitudinally extending flanges thereon, the flanges and sides of said sleeve and of said drawbar being substantially contiguous, a latch lever pivotally mounted between the flanges of said sleeve and extending longitudinally between the flanges of said drawbar, said lever comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions, a cam device mounted upon said sleeve and contacting said lever, and means to rotate said cam device to raise said bosses from the notches in the flanges of said drawbar.

6. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinal flanges thereon, the flanges of said sleeve and of said drawbar being substantially contiguous, a pair of latch levers pivotally mounted between the flanges of said sleeve and extending longitudinally between the flanges of said drawbar, each of said levers comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions, a cam device mounted upon said sleeve and contacting said levers, and means to rotate said cam device to raise said bosses from the notches in the flanges of said drawbar.

7. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinal flanges thereon, the flanges of said sleeve and of said drawbar being substantially contiguous, a latch lever pivotally mounted between the flanges of said sleeve and extending longitudinally between the flanges of said drawbar, said lever comprising a laterally extending boss overlying one of the flanges of said drawbar, and said flange of said drawbar having a plurality of spaced notches therein engageable by said boss to retain said drawbar in any of a plurality of longitudinally adjusted positions, and clamping means for clamping the sides of said sleeve against the sides of said drawbar.

8. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinal flanges thereon, the flanges of said sleeve and of said drawbar being substantially contiguous, a pair of latch levers pivotally mounted between the flanges of said sleeve and extending longitudinally between the flanges of said drawbar, each of said levers comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions, a cam device mounted upon said sleeve and contacting said levers, means to rotate said cam device to raise said bosses from the notches in the flanges of said drawbar, and clamping means extending between the flanges of said sleeve for frictionally clamping the sides of said sleeve against the sides of said drawbar.

9. A drawbar assembly for coupling a trailing vehicle to a leading vehicle comprising a sleeve having a pair of longitudinal flanges thereon, means for supporting said sleeve upon a vehicle with its longitudinal axis substantially aligned with the longitudinal axis of the vehicle, a drawbar slidably mounted in said sleeve and having a pair of longitudinally extending flanges thereon, the flanges and sides of said sleeve and of said drawbar being substantially contiguous, a latch lever pivotally mounted between the flanges of said sleeve and extending longitudinally between the flanges of said drawbar, said lever comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions, a cam device mounted upon said sleeve and contacting said lever, means to rotate said cam device to raise said bosses from the notches in the flanges of said drawbar when rotated to one position, and resilient means urging said lever to follow said cam device so as to urge said bosses into said notches when the cam device is rotated to another position.

10. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinally extending flanges thereon, the flanges and sides of said sleeve and of said drawbar being substantially contiguous, a latch lever pivotally mounted between the flanges of said sleeve and extending longitudinally between the flanges of said drawbar, said lever comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions, a cam device mounted upon said sleeve and contacting said lever, means to rotate said cam device to raise said bosses from the notches in the flanges of said drawbar when rotated to one position, and resilient means urging said lever to follow said cam device so as to lower said bosses into said notches when the cam device is rotated to another position, said resilient means comprising a follower lever pivotally mounted between the flanges of said sleeve, and a spring extending between said latch lever and said follower lever.

11. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinal flanges thereon, the flanges of said sleeve and of said drawbar being substantially contiguous, a pair of overlapping, oppositely pointing latch levers pivotally mounted between the flanges of said sleeve and extending longitudinally between the flanges of said drawbar, each of said levers comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions, a shaft extending between the flanges of said sleeve, a spring-loaded plunger extending radially from said shaft and contacting said levers, and means to rotate said shaft to raise said bosses from the notches in the flanges of said drawbar.

12. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinal flanges thereon, the flanges of said sleeve and of said drawbar being substantially contiguous, a pair of overlapping, oppositely pointing latch levers pivotally mounted between the flanges of said sleeve and extending longitudinally between the flanges of said drawbar, each of said levers comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions, a shaft extending between the flanges of said sleeve, a spring-loaded plunger extending radially from said shaft and contacting said levers, means to rotate said shaft to raise said bosses from the notches in the flanges of said drawbar, and clamping means extending between the flanges of said sleeve for frictionally clamping the sides of said sleeve against the sides of said drawbar.

13. A drawbar assembly for coupling a trailing vehicle to a leading vehicle comprising a sleeve having a pair of longitudinal flanges thereon, means for hingedly supporting said sleeve upon a vehicle with its longitudinal axis substantially aligned with the longitudinal axis of the vehicle, a drawbar slidably mounted in said sleeve and having a pair of longitudinal flanges thereon, the flanges of said sleeve and of said drawbar being substantially contiguous, a pair of overlapping, oppositely pointing latch levers pivotally mounted between the flanges of said sleeve and extending longitudinally between the flanges of said drawbar, each of said levers comprising a pair of laterally extending bosses of sufficient length to overlie the flanges of said drawbar, and the flanges of said drawbar having a plurality of spaced notches therein engageable by said bosses to retain said drawbar in any of a plurality of longitudinally adjusted positions, a shaft extending between the flanges of said sleeve, a spring-loaded plunger extending radially from said shaft and contacting said levers, means to rotate said shaft to raise said bosses from the notches in the flanges of said drawbar, and clamping means extending between the flanges of said sleeve for frictionally clamping the sides of said sleeve against the sides of said drawbar, said levers comprising eccentric straps encircling said shaft and said plunger.

14. A drawbar assembly for coupling a trailing vehicle to a leading vehicle comprising a pair of elongated telescoping members, one of which is movable longitudinally relative to the other, and means to hold said telescoping members in any of a plurality of longitudinally adjusted positions with respect to each other comprising a plurality of longitudinally spaced abutments on one of said members and abutment engaging means on the other of said members, said abutment engaging means comprising a pair of levers pivotally mounted on axes transverse to the longitudinal axes of said members and pointing toward each other, and a spring tensioned between said levers.

15. A drawbar assembly for coupling a trailing vehicle to a leading vehicle comprising a sleeve, means for supporting said sleeve upon a vehicle with its longitudinal axis substantially aligned with the longitudinal axis of the vehicle, a drawbar slidably mounted in said sleeve, and cooperating means on said sleeve and said drawbar to hold said drawbar in any of a plurality of longitudinally adjusted positions with respect to said sleeve comprising a plurality of spaced notches on said sleeve, a pair of levers mounted on said bar and having lugs engageable with said notches, said levers being pivotally mounted in spaced apart relation and pointing toward each other, cam means mounted on said bar and engaging the free ends of said levers to raise said lugs from said notches when rotated to one position, and resilient means urging said levers to follow said cam means when rotated to another position such that said lugs may drop into said notches.

16. A drawbar assembly for coupling a trailing vehicle to a leading vehicle comprising a sleeve having a longitudinal slot in its surface, a drawbar slidably mounted in said sleeve, said drawbar having longitudinal portions of its external surface contiguous to the internal surface of said sleeve, threaded tightening means mounted on said sleeve and spanning said slot, said means engaging the opposite sides of said sleeve and said sleeve being resilient to an extent to permit said means to draw said sleeve into frictional clamping engagement with said drawbar, a plurality of longitudinally spaced abutments on said drawbar in alignment with said slot, and abutment engaging means pivotally mounted on said sleeve.

DEWEY S. WEISS.

REFERENCES CITED

The following references are of record in the file of this patent:

UNITED STATES PATENTS

| Number | Name | Date |
|---|---|---|
| 1,085,038 | Hall et al. | Jan. 20, 1914 |
| 1,333,846 | Hensal | Mar. 16, 1920 |
| 1,802,257 | Imhofe et al. | Apr. 21, 1931 |
| 1,923,904 | Allen et al. | Aug. 22, 1933 |
| 2,174,063 | Richards | Sept. 26, 1939 |
| 2,327,308 | Johnston | Aug. 17, 1943 |
| 2,366,294 | Stringer | Jan. 2, 1945 |